(No Model.)

L. W. ROBARDS.
FLAX THRASHING MACHINE.

No. 262,982. Patented Aug. 22, 1882.

WITNESSES

INVENTOR
Lenard W. Robards.
By his Attorney

UNITED STATES PATENT OFFICE.

LENARD W. ROBARDS, OF NEWTON, ILLINOIS.

FLAX-THRASHING MACHINE.

SPECIFICATION forming part of Letters Patent No. 262,982, dated August 22, 1882.

Application filed May 16, 1882. (No model.)

*To all whom it may concern:*

Be it known that I, LENARD W. ROBARDS, a citizen of the United States, residing at Newton, in the county of Jasper and State of Illinois, have invented certain new and useful Improvements in Flax-Thrashing Machines, of which the following is a specification, reference being had therein to the accompanying drawings.

My invention consists in the construction of a machine for thrashing flax, that will operate while in motion, and will while passing through the field separate and clean the seed and deposit the straw on the ground where it may properly be left to rot preparatory to its future use; and it further consists in certain novel devices and arrangement of parts, which will be hereinafter more particularly described, and pointed out in the claims.

Figure 1:
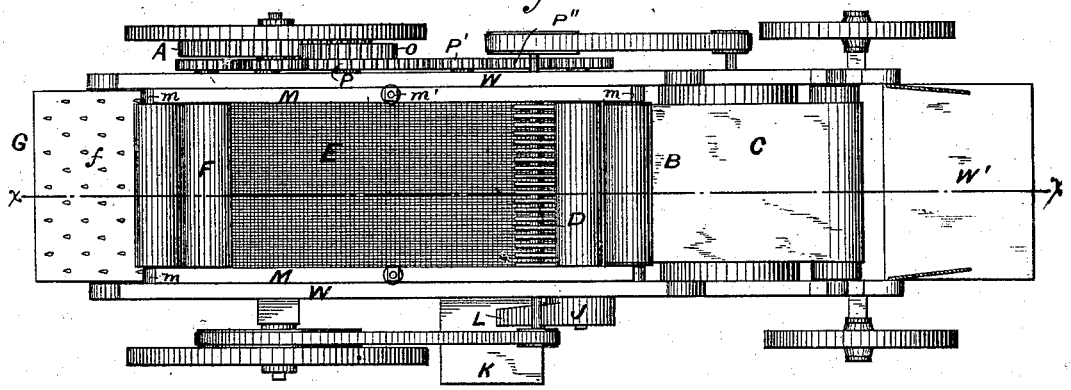
Figure 2:
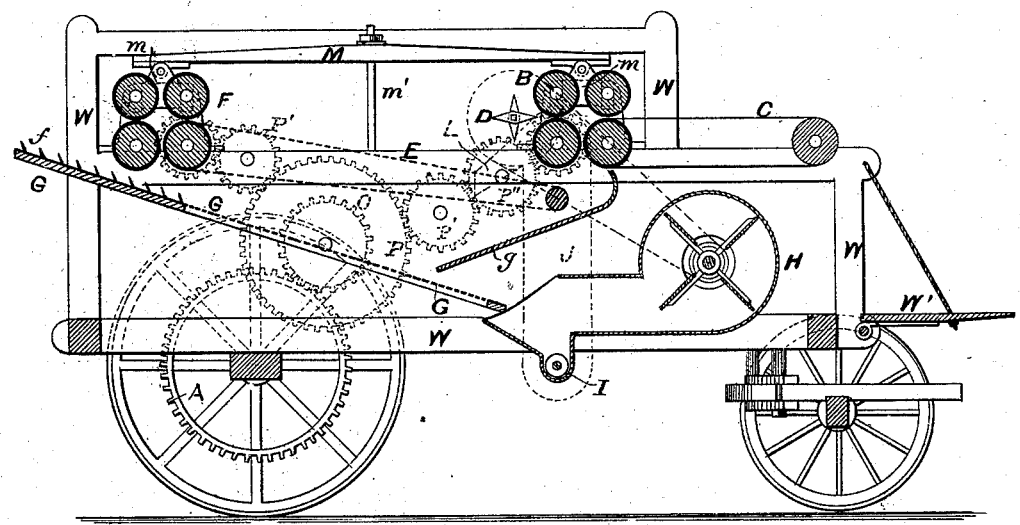
Figure 3:
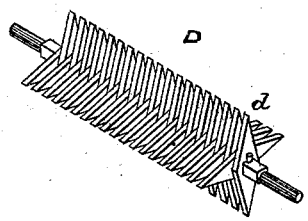

In the accompanying drawings, in which the same letters of reference indicate the same or corresponding parts, Figure 1 is a plan view of my improved flax-thrashing machine. Fig. 2 is a sectional view on lines $xx$ of Fig. 1. Fig. 3 is a detail view of the stripper and shaker.

In the drawings, W is the frame-work of the machine.

B and F are two sets of rollers, of any desired proportions, which are provided with a covering of rubber to form an elastic or yielding surface. Each set consists of two pairs of rollers.

M M are bars of elastic material, that extend from one set of rollers to the other, and are secured to the frame-work by adjusting-bolts $m'$, at or near their centers, and have their ends resting on the cross-bars $m$, connecting the two upper rollers of each set, the journals of which are adjustably secured in the frame, and by means of adjusting-bolts $m'$ the amount of pressure on the rollers is determined.

Close behind the rollers B is placed the stripper and shaker D, constructed of diamond-shaped plates of metal, having a square hole in their centers, which are placed across each other on a shaft having its middle portion square, the thickness of the plates $d$ regulating the space between the teeth, that can be varied as desired. The stripper and shaker D revolve at a moderate rate of speed, and operate to shake out and loosen the straw as it emerges from between rollers B, and at the same time to strip off the seed.

From the stripper D the straw falls onto an endless apron, E, and is conveyed to the secondary set of rollers, F, between which it passes, and, being received on the end portion of riddle G, by its motion the remaining loose seeds are shaken out and the straw is ejected, when it falls to the ground. The apron E is composed of slats or netting, so that the seed may fall through it as the straw is being conveyed from one set of rollers to the other. The sieve or riddle G is placed under the two sets of rollers, and extends beyond the end of the rollers F. It is of any suitable foraminous material through which the dust and trash can pass, but not the seed, and is provided with outwardly-inclined teeth $f$ at its rear or outer end, which enable the riddle to assist by its longitudinal motion the passage of the thrashed straw.

At the lower end of riddle G is situated a collecting-trough, in which is placed screw-conveyer I, on one end of the shaft of which is a pulley, over which the belt of elevator J passes.

The fan H is situated immediately in front of the collecting-trough, and by its blast expels the dust and other impurities from the seed in the course of its passage through the machine.

The endless apron C is situated in front of the forward set of rollers, and upon it is placed the flax to be conveyed to the rollers, or, if preferred, the flax may be fed direct to the rollers by hand.

The platform W' is for the feeder to stand on. The elevator J is contained within a suitable box provided with discharge-spout L.

The platform K extends from the frame W in such position that a sack placed upon it would receive the cleaned seed from discharge-spout L.

The two sets of rollers are driven by the gear-wheels O P P' P'' and the gear-wheel A', secured on the main driving-wheel, and are to be used double or single, as most convenient.

The flax is fed to the rollers, and, passing between their elastic faces, the seed-bolls are crushed without the straw being ground up or otherwise broken and injured. The stripper and shaker D loosen and shake up the mass as it issues from the rollers B, during which most of the seed falls out, and, passing through endless apron E to guide-board $g$, it passes to riddle G, where it is cleaned by it and the fan. The straw is carried by apron E to the second set of rollers, F, and in passing through them the remaining seed-bolls are crushed, and by the shaking of riddle G the liberated seed falls from the straw, which is then discharged on the ground.

I am aware that flax-thrashing machines have been constructed with more than one set of rollers for crushing the seed-bolls, said rollers being fluted, and also spirally grooved and revolving at different speeds. I therefore do not claim such construction or use, broadly.

What I claim, and desire to secure by Letters Patent, is—

1. In a flax-thrashing machine, the combination of primary and secondary crushing-rollers having elastic surfaces, with the adjustable pressure-bars M, endless apron E, stripper and shaker D, and the driving mechanism, as shown and described.

2. The combination of two sets of rollers formed with yielding surfaces, pressure-bars M, stripper D, apron E, guide-board $g$, riddle G, provided with teeth $f$, conveyer I, fan H, elevator J, platform K, and the driving mechanism operating to separate the seed from the straw while moving, as shown and described.

3. In a flax-thrashing machine, the shaker and stripper D, formed of diamond-shaped plates of metal arranged and secured across each other, in combination with the elastic rollers and driving machinery, as shown and described.

4. In a flax-thrashing machine, the combination and arrangement of the two sets of adjustable flexible rollers, perforated apron extending from one set of rollers to the other, the stripper and shaker D, guide-board, fan H, and riddle G, provided with outwardly-inclined teeth $f$ at its outer end, as shown and described.

In testimony whereof I affix my signature in presence of two witnesses.

LENARD W. ROBARDS.

Witnesses:
JOHN H. HALLEY,
FRED GREEN.